United States Patent [19]

Snyder et al.

[11] Patent Number: 4,900,536
[45] Date of Patent: Feb. 13, 1990

[54] PREPARATION OF PRECURSORS FOR YTTRIUM-CONTAINING CERAMIC SUPERCONDUCTORS

[75] Inventors: Thomas S. Snyder, Oakmont; Richard A. Stoltz, Murrysville, both of Pa.

[73] Assignee: Westinghouse Electric Corp., Pittsburgh, Pa.

[21] Appl. No.: 121,016

[22] Filed: Nov. 16, 1987

[51] Int. Cl.$^4$ .............................................. C01F 17/00
[52] U.S. Cl. ............................... 423/593; 423/21.1; 423/263; 505/1; 252/500; 252/518; 252/521; 501/152
[58] Field of Search ...................... 423/593, 71.1, 263, 423/264; 505/809, 810, 811, 815, 816, 818, 819, 1; 252/500, 518, 521; 535/15; 427/45.1, 55, 62, 63, 419.2, 419.3, 419.4, 419.6; 501/12, 152

[56] References Cited

U.S. PATENT DOCUMENTS

| | | | |
|---|---|---|---|
| 3,757,412 | 9/1983 | Mnzdiyasni et al. | 502/170 |
| 3,847,583 | 11/1974 | Dislich et al. | 501/12 |
| 3,895,097 | 1/1981 | Langenhoff | 423/341 |
| 3,925,062 | 12/1975 | Trombe et al. | 423/21.1 |
| 4,244,935 | 1/1981 | Dell | 423/491 |
| 4,266,978 | 5/1981 | Prochazka | 423/593 |
| 4,411,959 | 10/1983 | Braginski | 428/556 |
| 4,419,125 | 12/1983 | Charles | 75/0.5 B |
| 4,472,510 | 9/1984 | January | 501/12 |
| 4,485,094 | 11/1984 | Pebler et al. | 427/126.2 |
| 4,507,254 | 3/1985 | Ozaki | 260/429.2 |
| 4,543,341 | 9/1985 | Barringer et al. | 501/152 |
| 4,575,927 | 3/1986 | Braginski | 29/599 |
| 4,584,280 | 4/1986 | Nanao et al. | 501/12 |
| 4,588,575 | 5/1986 | David | 423/594 |
| 4,636,248 | 1/1987 | Ogata et al. | 423/593 |
| 4,636,378 | 1/1987 | Pastor et al. | 501/155 |
| 4,650,652 | 3/1987 | Naitou | 423/21.1 |
| 4,670,573 | 7/1975 | Greco | 556/182 |
| 4,696,810 | 9/1987 | Shirasaki et al. | 423/593 |
| 4,704,299 | 11/1987 | Wielonski et al. | 501/12 |
| 4,713,233 | 12/1987 | Marsh et al. | 423/593 |
| 4,764,357 | 8/1988 | Sherif | 423/593 |

FOREIGN PATENT DOCUMENTS 60-103031  6/1985  Japan .................... 423/593

OTHER PUBLICATIONS

Ku et al. "Superconductivity and Phase Stability in the Heavy Rare Earth Quaternary Compounds RBa$_2$Cu$_3$O$_7$ (R=Ho, Er, Tm, Yb, Lu)" in the Symposium of the MRS spring meeting, 1987.
Yoshizaki et al. "Superconducting Properties of La$_{1.85}$Sr$_{0.15}$CuO$_4$ Made by Hot Press and Sintered Methods".
Christen et al. "Correlations Among Thermal Processing, Superconducting Properties and Microstructure in La$_{1.85}$Sr$_{0.15}$CuO$_4$".
Willis et al., letter to the editor entitled "Superconductivity Above 90° K. in Magnetic Rare Earth-Barium-Copper Oxides" (Journal of Magnetism and Magnetic Materials 67, 1987, North Holland, Amsterdam).
Shamoto et al. Japanese Journal of Applied Physics, Apr., 1987, "Effect of Vacuum Annealing on the Superconducting Transition Temperature of La-Sr-Su-O System".
Uwe et al. May, 1987 Japanese Journal of Applied Physics "Affect of Hetero-Valiant Ion Doping in the High T$_C$ Y-Ba-Cu-O superconductor".
Kasowski et al. paper received Mar. 25, 1987 entitled (List continued on next page.)

Primary Examiner—Robert L. Stoll
Attorney, Agent, or Firm—R. A. Stoltz

[57] ABSTRACT

This is a process for making precursors for ceramic superconductor. It utilizes fluidized bed chlorination of a rare earth ore (e.g. xenotime or monazite) a separation of yttrium chloride by differential condensation at 725°–1200° C. and reaction with an alkali metal alkoxide to produce yttrium alkoxide for mixing with alkoxide of other non-oxygen constituents of the superconductor for producing an alkoxide composite for processing into the superconductor.

6 Claims, 1 Drawing Sheet

OTHER PUBLICATIONS

"Electronic Structure of Pure and Doped Orthorombic $La_2CuO_4$".

Cooke et al. "Thermally Stimulated Luminescence from Rare Earth Doped Barium Copper Oxides".

Bradley et al, Metal Alkoxides, Academie Press NY NY 1978, pp. 10–41, 335–338.

Dynamit Nobel Chemicals, Metal Alkoxides for Sol Gel Applications, Rockleigh N.J. undated.

Kramer et al. Preparation of Thin Film $YBa_2Cu_3O_{6+X}$ ceramic Superconductors via the Sol Gel Process, Material Research Society Symp. Proc. vol. 99, p. 323, Nov. 30–Dec. 4, 1987.

Brahme et al, Spectroscopic Study of High $T_c$ Super Conductors Derived by Solid State & Sol Gel Route, High-Temperature Superconductors II Apr. 5–9, 1988, pp, 289–291.

Zhewg et al, Superconducting $YBa_2Cu_3O_{7-x}$ Fibers Prepared by the Sol–Gel Process High Temperature Superconductors II Apr. 5–9, 1988 pp. 93–96.

Kramer et al High $T_c$ Superconducting Films & Powders Derived From The Sol-Gel Process, High Temperature Superconductors II, Material Res Soc Apr. 5-9-88 pp. 67–68.

Wu et al, Synthesis Study of Superconducting $YBaCu_3O_{7-x}$ powders from metal-alkoxides High Temper superconductors, materials Res Soc Nov. 30–Dec. 87 pp. 395–397.

Kramer et al, Highly orientated superconducting thin films derived from the Sol Gel Process, Applied phys Lett 53(2) 11 Jul. 88, pp. 156–158.

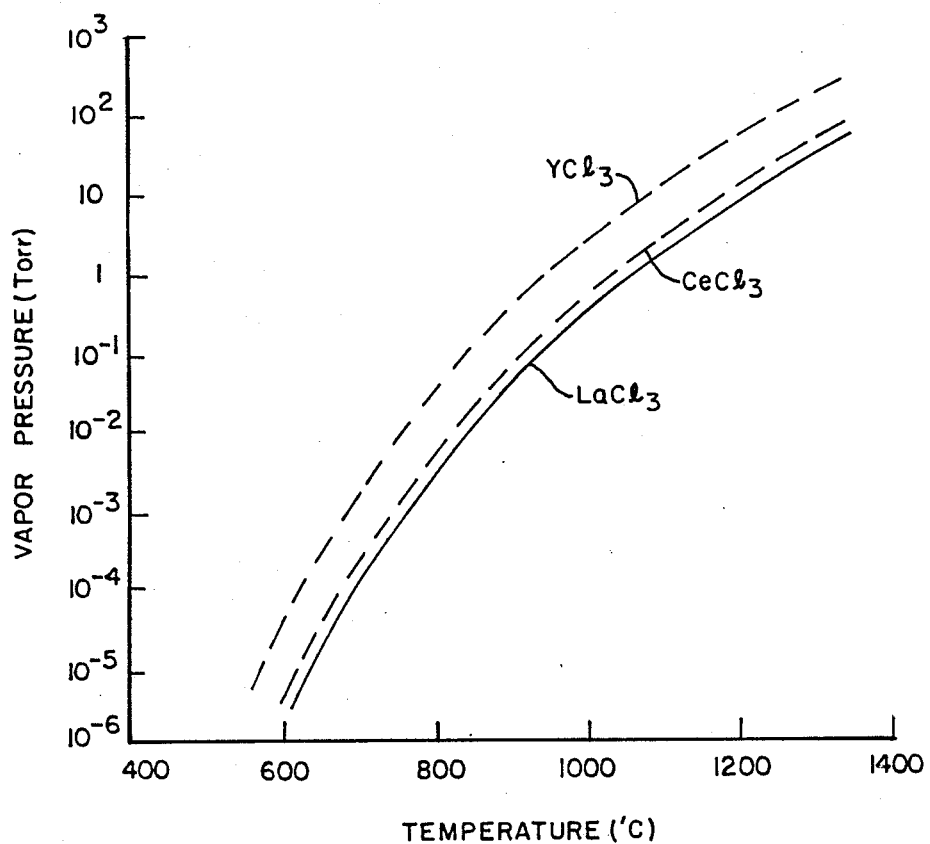

PREPARATION OF PRECURSORS FOR YTTRIUM-CONTAINING CERAMIC SUPERCONDUCTORS

CROSS-REFERENCE TO RELATED APPLICATIONS

Copending application Ser. No. 121,013, filed Nov. 16, 1987, teaches the suspension of single-crystal grains of superconductive oxide in an alkoxide gel, where the alkoxide gel contains non-oxygen consituents of the superconductor, aligning the single crystal grains of oxide superconductor, and curing the gel in an oxidizing atmosphere to form an essentially single-crystal ceramic superconductor.

Copending application Ser. No. 121,012, filed Nov. 16, 1987, teaches a fabrication process to convert lanthanide ores into metal alkoxide precursors for advanced ceramics. It utilizes fluidized bed chlorination of a lanthanide ore followed by separation of at least one high value rare earth as a by-product, with the remaining rare earth mixture being processed into alkoxides and blended with zirconium alkoxide for fabrication of zirconium ceramic.

Copending application Ser. No. 121,010, filed Nov. 16, 1987, teaches making single-crystal superconductive oxide from an alkoxide gel, where the alkoxide gel contains non-oxygen constituents of the superconductor, contacting the gel with a single crystal substrate, and curing the gel starting at the gel substrate interface to form an essentially single-crystal ceramic superconductor.

The preceding applications are all assigned to the same assignee and are all hereby incorporated by reference.

BACKGROUND OF THE INVENTION

1. Field of the Invention

This invention relates to superconducting ceramics, and in particular to a process utilizing fluidized bed chlorination to extract rare earth values from ore and the preparation of alkoxide precursors for the fabrication of superconducting ceramics.

2. Description of Related Art

The recent discovery by Muller and Bednorz of ceramic superconductors which are superconductive at relatively high temperatures (e.g. now 90 K. or above) has dramatically increased the interest in superconductivity and resulted in a large number of publications. The previous metallic superconductors such as niobium-tin or niobium-titanium required expensive liquid helium cooling. The new ceramic superconductors can be cooled by a relatively inexpensive means, such as liquid nitrogen. The ceramic superconductors have generally been oxides of at least one rare earth, at least one alkaline earth metal, and copper. Typically, the superconductors have been prepared by milling oxides of the rare earth and copper with an alkaline earth metal carbonate (e.g. yttrium oxide, copper oxide, and barium carbonate) and firing the mixture in an oxidizing atmosphere at 1000–1100 C., (typically regrinding, refiring, etc.) and then annealing the ceramic and oxygen at 400–900 C. for an extended period of time (e.g. 0.5–5 days).

Ku et al. in a Paper entitled "Superconductivity and Phase Stability in the Heavy Rare Earth Quaternary Compounds $RBa_2Cu_3O_7$ (R=Ho, Er, Tm, Yb, Lu)" in the Symposium of the MRS spring meeting, 1987, discussed superconductivity in the lanthanum-barium-copper oxide system. Their powders were milled, pressed, sintered, ground, repressed and annealed to prepare samples.

Yoshizaki et al. in a paper entitled "Superconducting Properties of $La_{1.85}Sr_{0.15}CuO_4$ Made by Hot Press and Sintered Methods" investigated superconducting transition properties by resistivity and magnetization in lanthanum-strontium-copper oxide for hot pressed and sintered samples. A single crystal was obtained in a portion of one sample.

Christen et al. in a paper entitled "Correlations Among Thermal Processing, Superconducting Properties and Microstructure in $La_{1.85}Sr_{0.15}CuO_4$" synthesized materials beginning with co-precipitation of lanthanum oxide, strontium oxide, and copper oxide from solution in molten urea followed by cold pressing into pellets, sintering/reacting at 1100 C. for four hours in air and annealing in flowing oxygen at 900 C. for 16 hours.

Willis et al. in a letter to the editor entitled "Superconductivity Above 90 K. in Magnetic Rare Earth-Barium-Copper Oxides" (Journal of Magnetism and Magnetic Materials 67, 1987, North Holland, Amsterdam) report measurements of superconducting and magnetic behavior on samples which were prepared by sintering the rare earth oxide, copper oxide, and barium carbonate in an oxygen atmosphere at 1000 C., regrinding and resintering at least twice more to promote reaction and obtain the desired phase.

Shamoto et al. in the Japanese Journal of Applied Physics, April, 1987, article entitled "Effect of Vacuum Annealing on the Superconducting Transition Temperature of La-Sr-Cu-O System" report the effect of vacuum annealing on the superconducting transition temperature of the superconductor lanthanum-strontium-copper oxide system. Their starting materials were apparently oxides pressed and sintered at about 1100 C.

Uwe et al. in the May, 1987 Japanese Journal of Applied Physics paper entitled "Affect of Hetero-Valiant Ion Doping in the High $T_C$ Y-Ba-Cu-O Superconductor" discussed the effect of cerium or lanthanum doping on the resistive transition of high $T_C$ superconductors (i.e. yttrium-barium-copper oxide). The samples were subjected to a procedure in which the material was pulverized, pressed and fired at 850–1000 C. for 2–10 hours in air or oxygen, with the procedure performed two or three times. Some of the samples were then annealed in oxygen at 700 C. for two or three hours. Their doping did not improve the properties and they saw some degradation.

Kasowski et al. in a paper received Mar. 25, 1987 entitled "Electronic Structure of Pure and Doped Orthorombic $La_2CuO_4$" investigate the electronic structure of orthorombic lanthanum-copper oxide and discuss the implications for superconductivity.

Cooke et al. in a paper entitled "Thermally Stimulated Luminescence from rare Earth Doped Barium Copper Oxides" discuss luminescence and emission spectrum measurements of rare-earth-doped barium-copper oxides. The loss of luminescence sensitivity with time, especially when the samples were maintained in vacuum, and the propensity of oxygen-defect perovskites to readily lose or gain oxygen were noted. It was suggested that these measurements might present a very sensitive way to investigate the problem of oxygen stability in these materials.

Braginski et al., in U.S. Pat. Nos. 4,411,959 and 4,575,927 issued Oct. 25, 1983 and Mar. 18, 1986, respectively, teach a submicron particle superconductor arrangement in which brittle superconductive particles remain unsintered in the fabricated wire, thus give a ductile wire, even though the superconducting material is brittle. The small particles provide spacing between particles of much less than the Ginzburg-Landau coherence lengths to avoid any significant degradation to $T_c$. U.S. Pat. No. 4,419,125 to Charles et al. on Dec. 6, 1983 teaches using liquid alkali metal to co-reduce a mixture of solid halides to produce such submicron powders. These three patents are hereby incorporated by reference.

Naitou et al. in U.S. Pat. No. 4,650,652, issued Mar. 7, 1987, relates to a process for recovering high purity rare earth oxides from a waste rare earth phosphor. The process utilizes dissolving waste rare earth phosphor in an excess amount of acid, adding oxalic acid to obtain precipitates of rare earth oxylates, washing precipitates and baking precipitates.

Ozaki et al. in U.S. Pat. No. 4,507,254, issued Mar. 26, 1985, relates production of a rare earth metal alkoxide by reacting a rare earth metal carboxylate with an alkali metal alkoxide in an inert organic solvent or liquid under anhydrous conditions.

U.S. Pat. No. 4,244,935, issued to Dell on Jan. 13, 1981, relates a method of forming the chloride of a metal-oxygen containing substance based on a fluid coking technique. It should be noted that the commercial process for making zirconium metal utilizes a fluidized bed process in which the ore is subjected to a chlorination step which produces a relatively impure, hafnium-containing zirconium tetrachloride and by-product silicon tetrachloride (which by-product is relatively easily separated by differential condensation). U.S. Pat. No. 3,895,097, issued to Langenhoff et al. on July 15, 1975, also relates to a process for reacting metal oxides with chlorine.

U.S. Pat. No. 4,670,573, issued to Greco et al. on June 2, 1987, relates to the preparation of metal alkoxides from metals and alcohols. The description of the prior art lists references that relate to the reaction of metals with alcohol to form metal alkoxides. Kirk-Othmer also discusses metal oxides of higher, unsaturated, or branched alcohols made from lower metal alkoxides on page 1, lines 25-50.

U.S. Pat. No. 4,472,510, issued to January on Sept. 18, 1984, relates to a process of making glassy ceramics, including a method of preparing a carbon-containing monolithic glassy ceramic including a metal alkoxide which hydrolyzes and polymerizes in the presence of water.

SUMMARY OF THE INVENTION

This is a process for extracting a yttrium superconductor component from a rare earth ore and using the yttrium superconductor component to prepare a composite for use in the fabrication of a ceramic superconductor. This process utilizes feeding a rare earth (which may have been concentrated by known, leaching processes), to a fluidized bed chlorinator to produce yttrium chloride and chlorides of other rare earths contained in the ore, separating the yttrium chloride by differential condensation at 725-1200 C. from (preferably refluxed at 900-1100 C.) the other rare earth chlorides, anhydrously reacting the separated yttrium chloride with at least one alkoxide selected from the group consisting of the alkali metal alkoxides (preferably sodium alkoxide especially $NaOCH_3$, $NaOC_2H_5$, $NaOC_3H_7$, $NaOC_4H_9$ or $NaOC_5H_{11}$) or alcohols to produce yttrium alkoxide, separating the yttrium alkoxide from the reaction by-products and excess reagents, and mixing the yttrium alkoxide with alkoxides of other non-oxygen constituents of the superconductor to produce an alkoxide composite for further processing into a superconductor.

Preferably, the separating of the yttrium alkoxide from reaction by-products and excess reagents is performed by evaporative crystallization followed by a distillative purification. Generally, the alkoxide reactant has 1-5 carbon atoms, and preferably one or two carbon atoms. Generally, the non-oxygen components are yttrium, at least one alkaline earth metal, and copper, however, some fluorine may also be included.

The utilization of alkoxides provides for extremely homogeneous superconductors. The process also allows introduction of stabilizers and dopants (to improve or modify electrical properties) which, heretofore had been ineffective due to inhomogeneous introduction.

BRIEF DESCRIPTION OF THE DRAWING

The sole FIGURE is a graph of vapor pressure (in Torr) as a function of temperature for chlorides of yttrium, cerium and lanthanum.

DESCRIPTION OF THE PREFERRED EMBODIMENTS

This invention provides a process for fabrication of precursors of a ceramic superconductor. By mixing alkoxides of the non-oxygen constituents, an extremely homogeneous composite is prepared. This allows the final electrical or electronic device properties to be tailored to provide exacting control of chemical and physical properties. Compared to prior fabrication approaches which used oxide feedstocks, the present process had the advantages of achieving chemical homogeneity, and providing easy formation using liquid polymers. The physical homogeneity in the matrix translates directly to improved microstructure of the product. The excessive milling and blending steps required for prior art powders, with their inherent introduction of contaminants, are eliminated.

It should be noted that the term "rare earth", as used herein, includes yttrium. It should also be noted that, as used herein, "alkoxide" includes alcohol soluble compounds of non-oxygen components (especially copper) whose non-metallic (e.g. non-copper) decomposition products are gaseous at less than 600 C. (e.g. copper acetate or copper acetyl acetate). Generally, the actual alkoxides are used where solubility is not a problem and such other alcohol soluble compounds are utilized to supply the remaining material for a stoichiometric mixture.

For superconducting materials, superior product performance is obtained where metal alkoxide precursors are used as process feedstocks. This product performance stems from the precise control of chemical composition, chemical homogeneity, and improved microstructure available with the alkoxide feedstocks, but not from the oxide feedstocks normally utilized. The high cost of alkoxide materials, has in the past, been a major impediment to wide spread application. The present invention integrates chlorination technology to generate the required alkoxide feed stocks to provide cost effective metal alkoxide production. The process accepts the rare earth ores (e.g. xenotime or monazite). It generally utilizes fluidized bed chlorination of either the ore or of an ore concentrate produced by leaching of the ore mixed with carbon, at about 800–1250 C., with chlorine gas providing chlorination and, together with an inert gas providing fluidization (generally similar to the known process for chlorinating zirconium ore) to produce rare earth chlorides. The yttrium chloride is separated from the other rare earth chlorides by differential condensation at 725–1200 C. (and preferably reflux condensation at 900–1100 C.). It should be noted that the boiling point of yttrium chloride is 1507 C. and that the boiling points of the other rare earths are a little over 1700 C. and that while chlorination and condensing the other rare earths (with the yttrium remaining vapor and being condensed separately later) at 1550 C. or 1600 C. is theroetically possible, such extremely high temperatures are impractical for commercial production. This invention avoids such temperatures by operating both chlorination and differential condensation below the rare earth chloride boiling points at relatively low partial pressures (see the sole FIGURE, the vapor pressures of the remaining rare earth chloride are not shown, but are similar to those of the chlorides of cerium and lanthanium) and generally uses an inert gas to give a total system operating pressures of about one atmosphere and preferably uses a reflux condenser to improve separation condensing the other rare earth chlorides first and separately condensing the yttrium chloride downstream. The vapor from a 950 C. chlorinator can be introduced near the bottom of a reflux condenser, with the condenser operated, e.g. at about 900 C. with a reflux reboiler on the bottom operated at 1000 C., such that the reboiler receives condensate liquid from the condenser and vaporizes and refluxes most of the condensate, thus improving separation. Refluxing is required with monazite ore which contains only about 2.1% of the total lanthanon oxide as yttria, and preferred for ores such as xenotime (which contains about 60.8% of the lanthanon oxide as yttria). It should be noted that the other rare earths are generally not separated from one another by the process of this invention, and the by-product is generally mixed rare earth chlorides, depleted in yttrium.

The yttrium chloride is then reacted, generally with sodium alkoxide (e.g. NaOCH$_3$), to produce an yttrium alkoxide (e.g. Y(OCH$_3$)$_3$). By utilizing the chloride reaction with sodium alkoxide, yttrium alkoxide is directly produced, with the reaction going to completion, avoiding the use of high temperatures and pressures and/or expensive catalyst. Alkoxide is then preferably crystallized, by evaporation off (and recycling) excess reagent. The yttrium alkoxide may then be separated from by-product salt (e.g. sodium chloride) by heating to distill off the yttrium alkoxide. An alkaline earth metal alkoxide can be similarly formed by reacting the chloride with sodium alkoxide. The purified yttrium alkoxide can then be blended with other alcohol soluble compounds of the other non-oxygen constituents (e.g. BaOCH$_3$ and copper acetyl acetate), to form a composite which may be gelled and eventually oxidized to produce the metal oxide ceramic superconductor.

This process provides for mixing on an atomic level and provides, at a reasonable cost, a homogeneous product which cannot be obtained by the prior art powder processes which utilize milling of oxides. The prior art processes, even with many cycles of grinding, firing, regrinding, refiring, etc., do not achieve mixing on an atomic level and inherently produce an inhomogeneous product. Applicants' invention, utilizing actual alkoxides or other alcohol soluble compounds produces a true solution and mixing of the (generally metallic), non-oxygen components on an atomic basis.

The process is broadly applicable to ceramic superconductors (e.g. yttrium-barium-strontium-copper oxides), however, the well-known yttrium-barium-copper oxide will be used for purposes of illustration. Thus the feed mixture for a gel may consist of stoichiometric amounts of yttrium and barium alkoxides with the copper generally being added as the aforementioned other alcohol soluble compound (e.g. copper acetyl acetate). The alcohol moieties on the feed stock alkoxides are selected to establish the desired microstructure and physical properties of the products, but in general are preferred to be $C_1$ through $C_5$ (and especially $C_1$ and $C_2$ as they require less oxygen during curing to the oxide) aliphatic chains. Table 1 below shows a procedure for forming an alkoxide gel.

TABLE 1

40–60 volume % metal yttrium alkoxide and barium alkoxide and copper as either copper acetate or copper acetyl acetate in solution
30–45 volume % ethanol or other alcohol ($C_1$–$C_5$)
5–15 volume % water Alternatively other alcohol/metal alkoxide combinations can be used. The reaction mix is polymerized in an exothermic reaction at the alcohol normal boiling point of 78.4 C. under reflux. The actual volume percent composition of the reaction mix can vary considerably.

| SPECIFIC RECIPE AND PROCEDURES USING YTTRIUM/BARIUM ALKOXIDES | | |
|---|---|---|
| | Preferred | Range |
| Deionized Water: | 4.4 | 2.3–7.89 |
| 200 Proof Ethanol: | 5.4 | 3–20 moles |
| 70 w/o HNO$_3$: | 10 drops | 10–30 drops |
| Mixed Alkoxides and Copper Weighed as Moles of "Metal" | 2.9 moles | 1.8–5 moles |
| Ethanol (200 proof): | 0.1 moles | .08–.5 moles |

1. Clean and dry glass reactor (see tare weight)
2. Weigh in water and ethanol
3. Add nitric acid
4. Mix contents to produce homogeneous mixture
5. Add mixed alkoxides and copper as rapidly as possible
6. Use absolute ethanol to bring weight up to 750 gram
7. Close reactor and agitate
8. Heat under alcohol reflux temperature for ⊥ 16 hours The alkoxide gel can be fabricated into final devices, for example, utilizing suspension of single crystal grains of superconducting oxide in the gel, as taught in the aforementioned application Ser. No. 121,013, or by contacting the gel with a single crystal substrate and curing starting at the gel-substrate interface, as taught in the aforementioned copending application Ser. No. 121,010. Alternatively, the ungelled mixture can be spray oxidized to produce a powder. Such powder, being extremely homogeneous, can be used, for example, for sputtering. It should be noted that this extremely homogeneous material overcomes the homogeneity problems in sputtered films (generally sputtered films have been unsatisfactory due to compositional variations within the film, and the inventors believe this inhomogeneity is caused by inhomogeneity in the milled oxide powder sputtering targets used as a source of material for sputtered films in the prior art).

Thus, this invention provides a process for extracting yttrium from a rare earth ore and using the yttrium to prepare a composite (gelled or ungelled) for use in the fabrication of a ceramic superconductor. This process utilizes a fluidized bed chlorinator to produce yttrium chloride and by-product mixed chlorides of non-yttrium rare earths, separating the yttrium chloride from the other rare earth chlorides by differential condensation at 725–1200 C., anhydrously reacting the yttrium chloride with preferably sodium methyl alkoxide to produce ytrrium methyl alkoxide, and preferably mixing the yttrium alkoxide with at least one alkaline earth metal alkoxide and an alcohol soluble copper compound, with the copper compound preferably being copper acetate or copper acetyl acetate or combinations thereof. In addition, a source of fluorine (e.g. an alcohol soluable copper and fluorine compound), as well as stabilizer or dopant alkoxides may also be added.

The invention is not to be construed as limited to the particular examples described herein, as these are to be regarded as illustrative, rather than restrictive. The invention is intended to cover all processes which do not depart from the spirit and scope of the invention.

We claim:

1. A process for extracting a yttrium component from a rare earth ore, or rare earth ore concentrate, containing rare earth values and using said ytrrium component to prepare a composite for use in fabrication of a metal oxide ceramic superconductor containing yttrium oxide, said process comprising:
   a. feeding said rare earth ore or ore concentrate to a fluidized bed chlorinator to produce a chloride of said yttrium component and chlorides other rare earths contained in said ore;
   b. separating said yttrium chloride by differential condensation from said other rare earth chlorides at 725–1200 C.;
   c. anhydrously reacting said separated said yttrium chloride with at least one alkoxide reactant selected from the group consisting of the alkali metal alkoxides to produce yttrium alkoxide and separating said yttrium alkoxide from reaction by-products and excess reagents; and
   d. mixing said yttrium alkoxide with alkoxides of other non-oxygen constituents of said metal oxide cermic superconductor, thereby producing an alkoxide composite, whereby said composite is useful for fabrication of a metal oxide ceramic superconductor.

2. The process of claim 1, wherein said separating of said yttrium alkoxide from reaction by-products and excess reagents is performed by evaporative crystallization followed by distillative purification.

3. The process of claim 1, wherein said at least one alkoxide reactant has one to five carbon atoms.

4. The process of claim 1, wherein said other non-oxygen components consist essentially of at least one alkaline-earth metal and copper and said alkoxide reactant is sodium alkoxide.

5. The process of claim 1, wherein said rare earth ore is leached prior to fluidized bed chlorination to concentrate the rare earth values in a rare earth concentrate.

6. A process for extracting yttrium from a rare earth ore containing yttrium and non-yttrium rare earths and using said yttrium to prepare a composite for use in fabrication of a metal oxide ceramic superconductor containing yttrium oxide and oxides of other major metallic constituents, said process comprising:
   a. utilizing a fluidized bed chlorinator to produce yttrium chloride and chlorides of non-yttrium rare earths contained in said ore;
   b. separating said chloride of yttrium from said non-yttrium rare earth chlorides by differential condensation at 900–1100 C.;
   c. anhydrously reacting said separated yttrium chloride with sodium methyl alkoxide reactant to produce an yttrium-alkoxide and separating said yttrium alkoxide from reaction by-products and excess reagents; and
   d. mixing said yttrium alkoxide with at least one alkaline earth metal alkoxide and at least one copper compound seleted from the group consisting of copper acetate and copper acetyl acetate, thereby producing an alkoxide composite, whereby said composite is useful for processing into a homogenous superconductor.

* * * * *